United States Patent [19]

Doemen

[11] Patent Number: 4,823,060

[45] Date of Patent: Apr. 18, 1989

[54] CIRCUIT ARRANGEMENT FOR GENERATING A MEASUREMENT SIGNAL ASSOCIATED WITH THE FREQUENCY OF AN ALTERNATING CURRENT SIGNAL

[75] Inventor: Benno Doemen, St. Georgen, Fed. Rep. of Germany

[73] Assignee: Papst-Motoren GmbH & Co. KG, Fed. Rep. of Germany

[21] Appl. No.: 85,566

[22] PCT Filed: Oct. 30, 1986

[86] PCT No.: PCT/DE86/00435

§ 371 Date: Jul. 6, 1987

§ 102(e) Date: Jul. 6, 1987

[87] PCT Pub. No.: WO87/03112

PCT Pub. Date: May 21, 1987

[30] Foreign Application Priority Data

Nov. 7, 1985 [DE] Fed. Rep. of Germany ....... 3539556

[51] Int. Cl.$^4$ .............................................. G01R 23/09
[52] U.S. Cl. ....................... 318/464; 307/519; 324/78 J; 328/140
[58] Field of Search ............... 318/328, 327, 326, 607, 318/618, 604, 561, 326, 327, 464; 307/519; 324/78 J; 328/140

[56] References Cited

U.S. PATENT DOCUMENTS

| | | | |
|---|---|---|---|
| 3,798,529 | 3/1974 | Jones | 328/140 X |
| 4,480,217 | 10/1984 | Robbins et al. | 318/618 |
| 4,488,096 | 12/1984 | Cap et al. | 318/328 |
| 4,498,036 | 2/1985 | Saleurka | 318/561 |
| 4,769,611 | 9/1988 | Frierdich | 307/519 X |

FOREIGN PATENT DOCUMENTS 210354 6/1984 German Democratic Rep. .

Primary Examiner—Bentsu Ro
Attorney, Agent, or Firm—Spencer & Frank

[57] ABSTRACT

A circuit arrangement for generating a useful direct voltage signal associated with the frequency of an alternating current signal serves, in particular, to regulate the synchronism of an electric motor. It includes a comparator circuit (7) which converts the two opposite polarity halfwaves of the alternating current signal of a tacho coil (2) into pulses whose edges trigger a measuring and control circuit (18) which generates direct voltages corresponding to the half-period durations of the alternating current signal measured from the respective zero passages. The comparison voltage input (9) of the comparator (7) is connected with the output of a differential amplifier (10) whose two inputs (29, 30) are each connected to a storage capacitor (27, 28) which can be connected, via associated first and second switches (80, 81), with the useful direct voltage signal (22), with the first switch (80) being used to periodically couple out the useful direct voltage signal associated with the first half-periods and the second switch (81) being used to periodically couple out the direct voltage signal associated with the second half-periods.

22 Claims, 3 Drawing Sheets

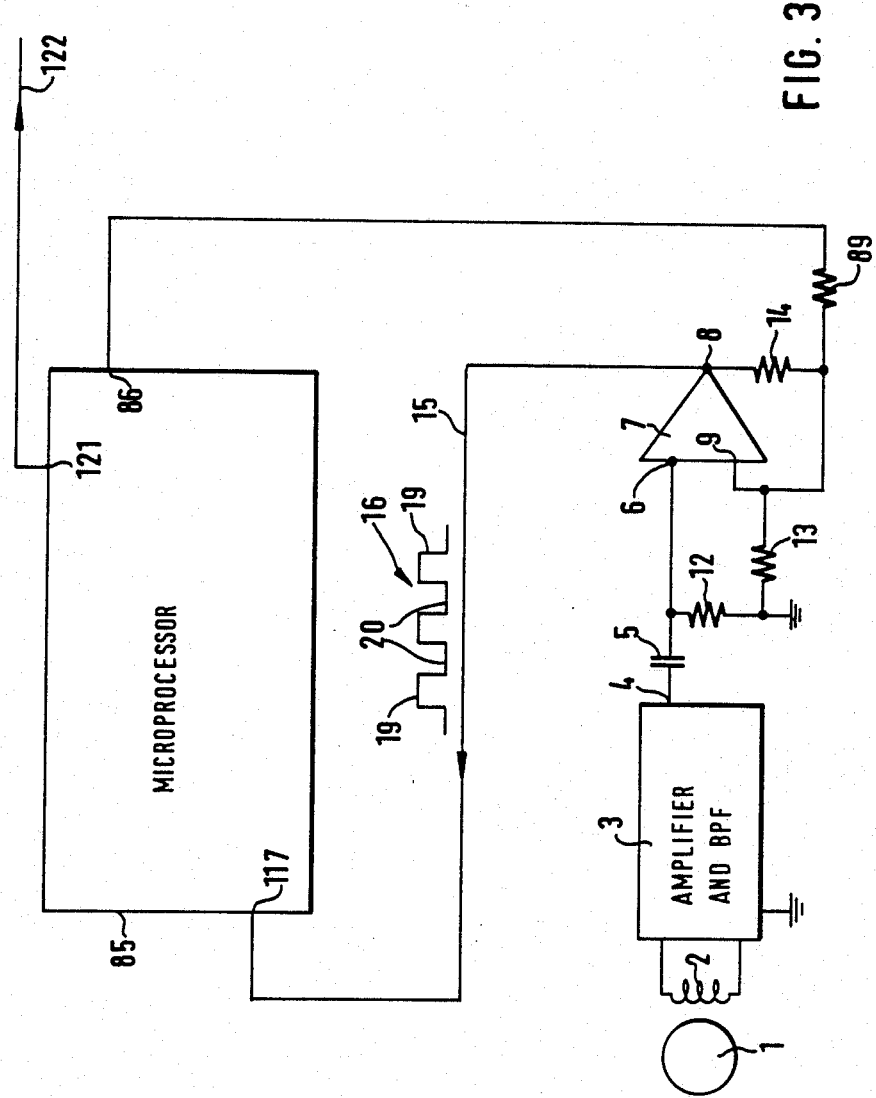

CIRCUIT ARRANGEMENT FOR GENERATING A MEASUREMENT SIGNAL ASSOCIATED WITH THE FREQUENCY OF AN ALTERNATING CURRENT SIGNAL

BACKGROUND OF THE INVENTION

The invention relates to a circuit arrangement for generating a useful direct voltage signal associated with the frequency of an alternating current signal, particularly for regulating the synchronism of an electric motor, the arrangement including a comparator circuit which converts two opposite polarity halfwaves of the alternating current signal into pulses whose edges trigger a measuring and control circuit which is able to generate direct voltages corresponding to the half-period durations of the alternating current signal measured from the respective zero passages.

Numerous circuits are known for converting the frequency of a sinusoidal signal voltage into a direct voltage that is proportional to that frequency. Frequently, the sample-and-hold principle is employed to furnish a frequency proportional direct voltage which has a sufficiently low residual ripple. After each trigger signal, a time proportional voltage is transmitted in bursts to a storage capacitor to replace the preceding measurement value. If only the ascending or descending zero passage of the signal voltage is selected as the trigger signal, it is possible to realize high repetition accuracy but only one trigger signal is obtained per full sinusoidal oscillation. However, trigger circuits are known already which furnish a trigger signal during each zero passage before or after the conversion of the sinusoidal voltage into a rectangular voltage (frequency doubling). These circuits are useful up to a certain accuracy. If, however, one desires to perform very precise angular velocity measurements, for example, to ensure or measure synchronism of a motor, two error sources must be compensated, one being caused by the offset voltage of the comparator and the other by periodic system specific harmonics in the tachogenerator.

SUMMARY OF THE INVENTION

Based on this state of the art, it is the object of the invention to provide a circuit arrangement of the above-mentioned type which is distinguished by high measuring accuracy, with the time delay caused by the effected frequency demodulation and by the filters as well as the residual ripple in the direct voltage remaining very low.

This is accomplished, according to the invention, in that the comparison voltage input of the comparator is connected with the output of a difference switching circuit, whose two inputs are each connected to a voltage store which is connectable with the useful direct voltage signal by way of associated first and second switches, with the first switch being used to periodically couple out the useful direct voltage signal associated with the first half-periods and the second switch being used to periodically couple out the useful direct voltage signal associated with the second half-periods.

Due to the fact that the useful direct voltage signal can be coupled out via the first and second switches, each time in association with the half-periods, it is possible to effect a regulation which ensures that the detected half-periods or half waves on the average have the same length over a period of time which is long compared to the period duration. In particular, this reliably and securely compensates for drifting of the comparator offset voltage which would otherwise lead to inaccuracies in the measurements. The voltage stores may be realized in a simple manner by means of storage capacitors. In a suitable embodiment, the difference switching circuit is configured as a differential amplifier, with the regulating circuit then exhibiting PI behavior.

BRIEF DESCRIPTION OF THE DRAWINGS

FIG. 3 is a block circuit diagram of a microprocessor controlled circuit arrangement according to the invention.

DESCRIPTION OF THE PREFERRED EMBODIMENTS

Figure 1:
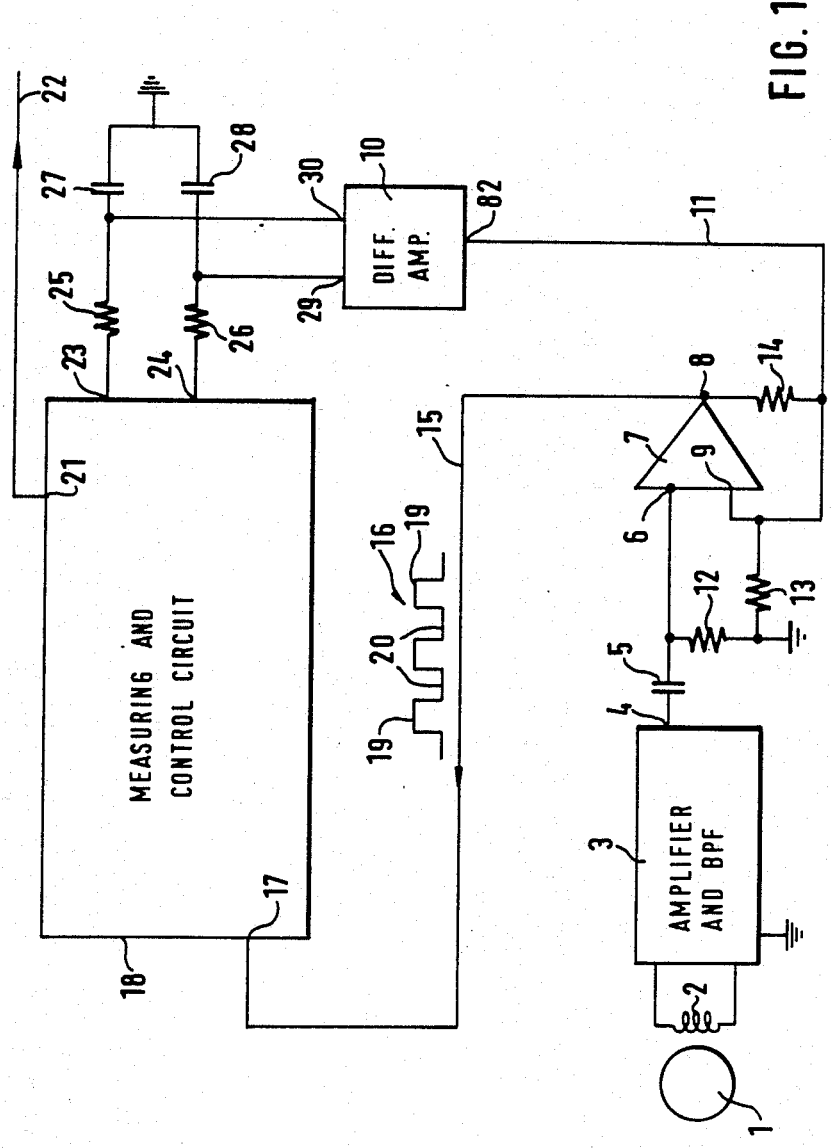
FIG. 1 is a block circuit diagram for the circuit arrangement according to the invention.

FIG. 1 shows the schematically illustrated tacho shaft 1 of an electric motor whose synchronism is to be measured. Tacho shaft 1 has an associated tacho coil 2 with which, for example, an alternating current signal at a frequency of 111 Hz is picked up. Both ends of tacho coil 2 are connected with the input of an amplifier and bandpass filter circuit 3 which amplifies the alternating current signals of tacho coil 2 and reduces superposed interference voltages which deform the symmetry of the halfwaves of the periodic alternating current signal. Output 4 of amplifier and bandpass filter circuit 3 is connected via a coupling capacitor 5 with the signal voltage input 6 of a comparator 7 at whose output 8 a logic one signal appears if, for example, the voltage at signal voltage input 6 is higher than the voltage at comparison voltage input 9. In a comparator 7 without offset voltage, a sinusoidal alternating voltage applied at the signal voltage input 6, with the comparison voltage input 9 connected to ground, would furnish a pulse-shaped signal at output 8 whose pulse/pulse pause ratio would be precisely one, i.e. the signal would alternatingly have a one state and a zero state over time periods of the same length.

To avoid errors as a result of the offset voltage of comparator 7 or due to long-time drifts and temperature drifts during the conversion of the alternating current signal into a pulse train, comparison voltage input 9 is connected via a line 11 with the output of a differential amplifier 10. As can also be seen in FIG. 1, comparator 7, which includes an operational amplifier, is additionally equipped with resistors 12, 13 and 14. Via a line 15, the originally sinusoidal tacho signal, now converted to a digital pulse train 16, reaches input 17 of a measuring and control circuit 18 which is essentially a frequency/-voltage converter.

In dependence on the duration of the one-pulses 19 and the zero-pulses 20, measuring and control circuit 18 generates direct voltage signals to ensure accurate frequency/voltage conversion and thus a precise measurement of the synchronism of the motor connected with tacho shaft 1.

While a useful direct voltage signal is coupled out via a line 22 at output 21 of measuring and control circuit 18, with the voltage of this signal changing in correspondence with the changes in frequency of the alternating current signal fed in by tacho coil 2, direct voltage signals are present at outputs 22 and 23. The magnitude of these direct voltage signals is associated with the length in time of one-pulses 19 and the length in time of zero-pulses 20, respectively. Thus, with a completely symmetrical pulse train 16, the voltages at outputs 23, and 24 are identical so that storage capacitors 27 and 28 connected to outputs 23 and 24 via resistors 25 and 26 charged to the same voltages. If, for example, the voltage at comparison voltage input 9 of comparator 7 changes in such a manner that one-pulses 19 become longer and zero-pulses 20 become shorter, the voltage associated with the duration of one-pulses 19 and present, for example, at output 23, becomes greater while the voltage present at output 24 becomes smaller. This also occurs if the sinusoidal halfwaves at signal voltage input 6 are positive halfwaves whose half-period duration is greater than the half-period duration of the negative halfwaves.

While the useful direct voltage signal in line 22 should respond relatively quickly to changes in the keying ratio of pulse train 16, the regulating circuit for generating a voltage for comparison voltage input 9 of comparator 7 should be slower in time. For this reason, the values of resistors 25 and 26 and storage capacitors 27 and 28 and are selected in such a manner that the voltages present at inputs 29 and 30 of differential amplifier 10 are averages taken over a plurality of periods of the alternating current signal at signal voltage input 6 of the comparator.

The circuit shown in FIG. 1 thus measures the duration of the positive and negative halfwaves of the alternating current signals generated by tacho coil 2, with the results present as direct voltage signals which are stored separately in storage capacitors 27 and 28. The slower acting regulating circuit including comparator 7, measuring and control circuit 18 and differential amplifier 10 automatically shifts the switching point of comparator 7 so that over a relatively long period of time, which is freely selectable by the dimensioning of the components, the sums of the positive and negative halfwaves put out by comparator 7 have the same length. Temporary changes are fully detected via line 22 and only a slow drifting away, for example due to changes in the temperature of the circuit of comparator 7 or changes in the temperature of the magnetic circuit of tacho coil 2, are regulated out. The circuit shown in FIG. 1 thus permits conversion of the frequency of the sinusoidal alternating current signal furnished by tacho coil 2 into a direct voltage proportional to the frequency, with measuring and control circuit 18 beginning a new time measurement with every zero passage of the sinusoidal alternating current signal. The reference line for the zero passages is formed in the control loop of the circuit of FIG. 1 according to the criterion that over a period of time which is very long compared to the period duration, the partial measuring results of the positive and negative halfwaves present at outputs 23 and 24 have the same length.

Figure 2:
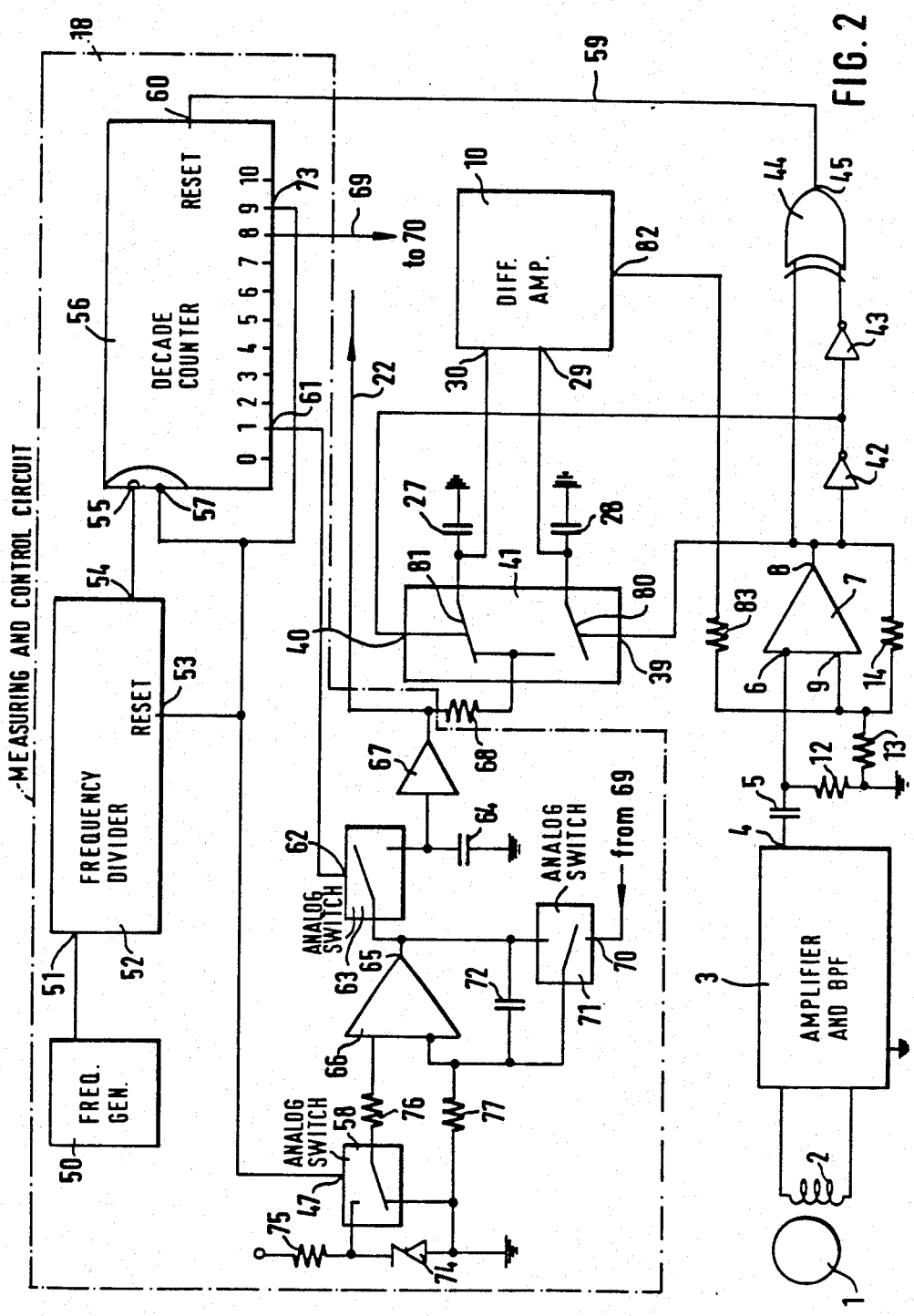
FIG. 2 is a block circuit diagram according to FIG. 1 including a detailed illustration of the measuring and control circuit for time measurement and control.

FIG. 2 shows a possible circuit for measuring and control circuit 18 together with an actuation circuit which makes it possible to feed the direct voltage components associated with the respective positive and negative halfwaves separately to differential amplifier 10. Elements coinciding with those in FIG. 1 are given the same reference numerals in FIG. 2.

Output 8 of comparator 7 is connected with the first control input 39 of a CMOS analog switching circuit 41. The second control input 40 of CMOS analog switching circuit 41 is charged with a signal which is inverted compared to the first control input and which is obtained at the output of a first inverter 42, whose input is likewise connected to output 8 of comparator 7. The first inverter 42 is followed by a second inverter 43. The output of the second inverter 43 is connected with one input of an Exclusive/OR gate 44. The second input of Exclusive/OR gate 44 is connected directly with output 8 of comparator 7. Due to the switching delay caused by the two inverters 42, 43, short pulses result at output 45 of Exclusive/OR gate 44 whenever comparator 7 switches over. In this way, short pulses are associated with every halfwave of the alternating current signal at signal voltage input 6 of comparator 7.

In FIG. 2, the part of the circuit framed in dash-dot lines essentially corresponds to measuring and control circuit 18 of FIG. 1. It includes a frequency generator 50 having an output frequency of, for example, 4 MHz. The output of frequency generator 50 feeds clock pulse input 51 of a frequency divider 52, which may be realized by a 12-bit counter. Frequency of divider 51 also has a reset input 53 as well as an output 54. At a frequency of 4 MHz for frequency generator 50, a frequency of 1.953125 KHz is then present at output 54, with the clock period $T_A$ of the pulse-shaped signal being 0.512 ms.

Output 54 of frequency divider 52 is connected with the clock pulse input 55 of a decade counter 56. As can also be seen in FIG. 2, output 73 of the last stage of decade counter 56 is connected with the enabling input 57 of the counter, with the reset input 53 of frequency divider 52 and with a control input 47 of an analog switch 58.

If a pulse appears at output 45 of Exclusive/OR gate 44, the former is always brought via a line 59 to reset input 60 of decade counter 56. This sets decade counter 56 to zero. With the first positive edge appearing at clock pulse input 55 after resetting, decade counter 56 switches to counter state 1 so that a control signal appears at output 61. This control signal is fed to the control input 62 of an analog switch 63, which may be a field effect analog switch. When analog switch 63 closes, a storage capacitor 64 is connected with the output 65 of an operational amplifier 66 connected as integrator. The voltage present at storage capacitor 64 travels via a voltage follower 67 serving as an impedance converter to a resistor 68 which has a function corresponding to resistors 25 and 26. Additionally, the output signal of voltage follower 67 travels to line 22, which represents the output line of the circuit arrangement and carries the useful direct voltage signal.

Upon the occurrence of the second positive edge after the resetting of decade counter 56, decade counter 56 switches to counter state 2, so that the control signal at output 61 disappears. Finally, decade counter 56 reaches counter state 8 and furnishes a signal via line 69 to the control input 70 of a further analog switch 71, the closing of which causes storage capacitor 72, which is part of an integrator circuit including operational amplifier 66, to be discharged.

With the next pulse at clock pulse input 55, decade counter 56 switches to counter state 9 and, due to the feedback connection of the associated output 73 with enabling input 57, blocks itself. At the same time, analog switch 58 is switched to the position not shown in the drawing so that operational amplifier 66 can become effective as time integrator. For this purpose, a direct voltage is applied via a resistor 75 to a temperature compensated Zener diode 74 and travels via resistors 76 and 77 to the inputs of operational amplifier 66. For the angular velocities of tacho shaft 1 at the above stated frequencies, the state last described above has a duration between 0.103 ms and 0.193 ms, with an accuracy of ±1%.

During this measuring period, a measuring voltage develops at output 65, with the magnitude of this voltage depending on when the next reset pulse for decade counter 56 appears at output 45; this reset pulse coincides with the beginning of the next halfwave at signal voltage input 6 of comparator 7. After resetting of decade counter 56, the latter is able to begin counting again and, by actuation of analog switch 63, conducts the voltage value associated with the duration of the halfwave to storage capacitor 64. From capacitor 64 this voltage value travels to line 22 and, depending on the position of switches 80 and 81 of CMOS analog switching circuit 41, also to storage capacitor 27 or to storage capacitor 28. The circuit arrangement may be such that all useful direct voltage signals associated with the positive halfwaves charge storage capacitor 27 while all useful direct voltage signals associated with the negative halfwaves feed storage capacitor 28.

If the detected positive and negative halfwaves have the same lengths, identical voltages are present at inputs 29 and 30 of differential amplifier 10, so that no further regulation takes place. If, however, due to an interference, different voltages occur at inputs 29 and 30, a regulating signal is generated at output 82 of differential amplifier 10 and is conducted via a resistor 83 to comparison voltage input 9 of comparator 7 so that the position of the reference voltage defining the zero passages of the alternating voltage is changed. This follow-up regulation makes it possible for the useful direct voltage signal present at line 22 to always be a precise measure of the angular velocity of tacho shaft 1.

In the embodiment shown in FIG. 3, those elements which coincide with elements of the embodiments shown in FIGS. 1 and 2 are given the same reference numerals. Pulses 19 and 20 derived from the rotation of tacho shaft 1 travel via line 15 to the input 117 of a microprocessor circuit 85.

The microprocessor provided in microprocessor circuit 85 includes a memory, preferably a fixed value memory, and a program which enables the microprocessor to determine the frequency of pulses 19 and 20 and send from its measurement signal output 121 a measurement signal to a line 122 which may, for example, be a data bus. At regular intervals, the pulse frequency at input 117 is evaluated to generate a measurement signal. Each measurement signal may, for example, be composed of one or a plurality of 8-bit words which together represent a digital value for the measurement signal. However, microprocessor circuit 85 may also be configured in such a way that the digital output signal of the microprocessor is converted, in a digital/analog converter, into a direct voltage which is put out via line 122 to monitor, for example, the number of revolutions of a motor coupled with tacho shaft 1 or its synchronism.

However, the program stored in the memory of microprocessor circuit 85 not only determines the pulse frequency, averaged over a plurality of pulses, it also monitors whether the pulses generated by comparator 7 from the positive halfwaves and those generated from the negative halfwaves have the same length. For this purpose, the microprocessor is used to form, for example, for the duration of ten periods of the alternating current signal, a value for the average duration of the pulses associated with the positive halfwaves. Correspondingly, an average duration value is determined for the duration of the pulses associated with the negative halfwaves. If the pulse lengths of these pulses 19 and 20 are identical, it is not necessary to change the direct voltage signal present at the comparison voltage input 9 of comparator 7. If, however, there is a deviation between the pulse lengths associated with the positive halfwaves and those associated with the negative halfwaves, the microprocessor computes this difference and furnishes a corresponding correction signal at control signal output 86 which is fed to comparison voltage input 9.

However, the signal appearing at control signal output 86 may be a direct voltage signal having a certain sign and derived with the aid of a digital/analog converter included in microprocessor circuit 85. Alternatively the digital/analog converter may be connected with a data output of the microprocessor at which the respective correction signal is present, for example, as an 8-bit word.

The instructions required to set up the program in machine language depend on the configuration of the respective microprocessor provided in microprocessor circuit 85 and are known to the person skilled in the art so that a detailed description of the machine programs is not considered necessary.

What is claimed is:

1. A circuit arrangement for receiving an alternating current input signal and for generating a measurement signal having a value corresponding to the frequency of the alternating current input signal, comprising: comparator circuit means, responsive to the alternating current input signal and to a reference value signal, for converting the two opposite polarity halfwaves of the alternating current input signal into pulses; measuring and control circuit means, triggered by the edges of the pulses, for generating the measurement signal and for additionally generating first and second further signals which respectively correspond to the positive and negative halfwave durations of the alternating current input signal, measured from the respective zero passages of the alternating current input signal compared to the reference value signal; means for continuously averaging and storing the first further signal over a plurality of periods to generate a first stored value; means for continuously averaging and storing the second further signal over a plurality of periods to generate a second stored value; and means for taking the difference of the first and second stored values to generate the reference value signal for the comparator circuit means.

2. A circuit arrangement according to claim 1, wherein the comparator circuit means has a signal input port, and further comprising an amplifier and bandpass filter circuit connected to the signal input port of the comparator circuit means.

3. A circuit arrangement according to claim 2, wherein the amplifier bandpass filter circuit has an input port, and wherein the alternating current input signal is generated by a a tacho coil which is connected to the input port of the amplifier and bandpass filter circuit, the tacho coil being associated with a tacho shaft of an electric motor.

4. A circuit arrangement according to claim 1, wherein the measurement signal is a direct voltage signal.

5. A circuit arrangement according to claim 1, wherein the measurement signal is a digital signal.

6. A circuit arrangement according to claim 1, in combination with a motor and a tachometer coupled to the motor, the tachometer generating the alternating current input signal.

7. A circuit arrangement for receiving an alternating current input signal and for generating an output signal having a voltage corresponding to the frequency of the alternating current input signal, comprising: comparator circuit means, responsive to the alternating current input signal and to a reference value signal, for converting the two opposite polarity halfwaves of the alternating current input into pulses; measuring and control circuit means, triggered by the edges of the pulses, for generating the output signal, the measuring and control circuit means additionally including further means for generating first and second further signals corresponding respectively to the positive and negative halfwaves durations of the alternating current input signal, measured from the respective zero passages of the alternating current input signal compared to the reference value signal; first storage means for storing the first further signal; second storage means for storing the second further signal; and a difference circuit having first and second inputs which are connected respectively to the first and second storage means, the difference circuit additionally having an output which provides the reference value signal for the comparator circuit means, wherein the further means includes first and second switches, the first switch periodically coupling the output signal to the first storage means during positive halfwaves of the alternating current input signal and the second switch being used periodically coupling the output signal to the second storage means during negative half waves of the alternating current input signal.

8. A circuit arrangement according to claim 7, wherein the first and second storage means comprise storage capacitors.

9. A circuit arrangement according to claim 8, wherein the further means further comprises a resistor connected to one of the switches.

10. A circuit arrangement according to claim 9, wherein the storage capacitors are part of a circuit having a time constant which is a multiple of the period duration of the alternating current input signal.

11. A circuit arrangement according to claim 8, wherein the difference circuit comprises a differential amplifier which is connected as PI controller.

12. A circuit arrangement according to claim 7, wherein the difference circuit comprises a differential amplifier which is connected as PI controller.

13. A circuit arrangement according to claim 12, wherein the further means further comprises a resistor connected to one of the switches.

14. A circuit arrangement according to claim 7, wherein the comparator circuit means comprises a comparator having an output port, wherein the further means further comprises an invertor connected to the output port of the comparator, and wherein the switches are CMOS analog switches having control inputs, the control input of one switch being connected directly with the output port of the comparator and the control input of the other switch being connected with the output port of the comparator via the invertor.

15. A circuit arrangement according to claim 7, in combination with a motor and a tachometer coupled to the motor, the tachometer generating the alternating current input signal.

16. A circuit arrangement for receiving an alternating current input signal and for generating a measurement signal having a value corresponding to the frequency of the alternating current input signal, comprising: comparator circuit means for converting the two opposite polarity halfwaves of the alternating current input signal into pulses, the comparator circuit means including a comparator having a first input port, a second input port responsive to the alternating current input signal, and an output port for furnishing the pulses; and microprocessor means, having a control signal output port which is electrically connected to the first input port of the comparator, a microprocessor input port which is electrically connected with the pulse furnishing output port of the comparator, and a measurement signal output port for generating the measurement signal at the measurement signal output port and for additionally generating a correction signal at the control signal output port, the correction signal having a magnitude which is a measure of the difference, averaged over a plurality of pulses, between the duration of the pulses associated with the positive halfwaves of the alternating current input signal and the duration of the pulses associated with the negative halfwaves of the alternating current input signal, the microprocessor means being triggered by the edges of the pulses.

17. A circuit arrangement according to claim 16, wherein the microprocessor means comprises a digital/analog converter connected to the control signal output port.

18. A circuit arrangement according to claim 16, in combination with a motor and a tachometer coupled to the motor, the tachometer generating the alternating current input signal.

19. A frequency-to-voltage converter, comprising:
comparator means, responsive to an alternating current input signal and to a reference value signal, for generating a pulse train having digitally high values and digitally low values;
means, responsive to the pulse train, for generating an output signal having a value which is a function of the frequency of the alternating current input signal; and
means for generating the reference value signal for the comparator means, the means for generating the reference value signal being responsive to the pulse train and including means for finding the difference between the average time that the pulse train has digitally high values and the average time that the pulse train has digitally low values.

20. The converter of claim 19, wherein the means for finding the difference comprises a first capacitor to store electrical charge, means for changing the charge on the first capacitor when the pulse train is digitally high, a second capacitor to store electrical charge, means for changing the charge on the second capacitor when the pulse train is digitally low, and a difference amplifier having a first input port connected to the first capacitor and a second input port connected to the second capacitor.

21. The converter of claim 20, wherein the comparator means comprises a comparator having an output port, wherein the means for changing the charge on the first capacitor comprises a first analog switch connected to the first capacitor, the first analog switch having a control port which is connected to the output port of the comparator, and wherein the means for changing the charge on the second capacitor comprises an invertor having an output port and an input port which is converted to the output port of the comparator, and a second analog switch connected to the second capacitor, the second analog switch having a control port which is connected to the output port of the comparator.

22. The converter of claim 19, wherein the comparator means comprises a comparator having a reference value input port and an output port, and wherein both the means for generating an output signal and the means for generating the reference value signal comprise a microprocessor having an input port which is electrically connected to the output port of the comparator, a first output port which provides the output signal having a value which is a function of the frequency of the alternating current input signal, and a second output port which is electrically connected to the reference value input port of the comparator.

* * * * *